(12) United States Patent
Goehnermeier et al.

(10) Patent No.: US 10,495,441 B2
(45) Date of Patent: Dec. 3, 2019

(54) PROBING ELEMENT AND COORDINATE MEASURING MACHINE FOR MEASURING AT LEAST ONE MEASUREMENT OBJECT

(71) Applicant: Carl Zeiss Industrielle Messtechnik GmbH, Oberkochen (DE)

(72) Inventors: Aksel Goehnermeier, Essingen-Lauterburg (DE); Ferdinand Bader, Ellwangen (DE); Dietrich Imkamp, Schwaebisch Hall (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 16/157,707

(22) Filed: Oct. 11, 2018

(65) Prior Publication Data

US 2019/0107381 A1    Apr. 11, 2019

(30) Foreign Application Priority Data

Oct. 11, 2017 (DE) .......... 10 2017 218 086

(51) Int. Cl.
*G01B 11/00* (2006.01)
*G01B 9/02* (2006.01)
*G01B 5/008* (2006.01)
*G01B 5/28* (2006.01)
*G01B 11/30* (2006.01)

(52) U.S. Cl.
CPC ......... *G01B 9/02031* (2013.01); *G01B 5/008* (2013.01); *G01B 5/28* (2013.01); *G01B 11/303* (2013.01)

(58) Field of Classification Search
CPC .. G01B 9/02031; G01B 11/02; G01B 11/005; G01B 11/303; G01B 11/24; G01B 5/28; G01B 5/008; G01M 11/00; G06T 7/0004; G06T 7/70
USPC ................... 356/601–623; 33/503, 556–561
See application file for complete search history.

(56) References Cited

U.S. PATENT DOCUMENTS

| 5,118,956 A | 6/1992 | Dunning et al. |
| 5,785,651 A | 7/1998 | Kuhn et al. |
| 6,163,973 A | 12/2000 | Matsumiya et al. |

(Continued)

FOREIGN PATENT DOCUMENTS

| DE | 10244552 B3 | 2/2004 |
| DE | 10244553 B3 | 2/2004 |

(Continued)

*Primary Examiner* — Hoa Q Pham
(74) *Attorney, Agent, or Firm* — Falk Ewers; Ewers IP Law PLLC (57) ABSTRACT

A probing element for measuring at least one measurement object is provided. The probing element includes at least one first optical sensor configured to generate at least one first sensor signal depending on a fine shape of at least one surface of the measurement object, at least one second sensor configured to generate at least one second sensor signal depending on at least one of a coarse shape of the measurement object, and a distance to the measurement object. The at least one first optical sensor has a first measurement region and the at least one second sensor has a second measurement region. The at least one first optical sensor is at least partly integrated in the at least one second sensor to permit the first measurement region and the second measurement region to at least partly overlap.

16 Claims, 3 Drawing Sheets

(56) References Cited

U.S. PATENT DOCUMENTS

| | | |
|---|---|---|
| 7,339,679 B2 | 3/2008 | Drabarek et al. |
| 7,400,408 B2 | 7/2008 | Drabarek et al. |
| 9,383,190 B1 * | 7/2016 | Shafer .................. G01B 11/005 |
| 10,309,765 B2 * | 6/2019 | Seitz .......................... G06T 7/70 |
| 2014/0053423 A1 * | 2/2014 | Brenner ................. G01B 5/012 33/503 |
| 2019/0003813 A1 * | 1/2019 | Ruck ...................... G01B 5/012 |

FOREIGN PATENT DOCUMENTS

| | | |
|---|---|---|
| DE | 69828568 T2 | 3/2006 |
| DE | 102005061464 A1 | 7/2007 |
| DE | 102007017664 A1 | 10/2008 |
| DE | 102015103373 A1 | 12/2015 |

* cited by examiner

PROBING ELEMENT AND COORDINATE MEASURING MACHINE FOR MEASURING AT LEAST ONE MEASUREMENT OBJECT

CROSS REFERENCE TO RELATED APPLICATIONS

This application claims priority to German patent application DE 10 2017 218 086.2, filed Oct. 11, 2017, the entire content of which is incorporated herein by reference.

TECHNICAL FIELD

The invention relates to a probing element, a coordinate measuring machine, and a method for measuring at least one measurement object. The present invention relates, in particular, to the field of coordinate measuring technology.

BACKGROUND

Various devices and methods for measuring measurement objects are known from the prior art. Coordinate measuring machines having tactile sensors which probe a surface of the measurement object, for example mechanically, are used, for example. Tactile sensors of this type typically have a probing element in the form of a probe ball that is secured to a transmission element. During probing by the probe ball with the measurement object, forces that arise on the probe ball are measured in three axes and a direction vector of the probing, the so-called probing vector, is determined therefrom, and the measurement object is thus measured. Devices having optical sensors, in particular coordinate measuring machines having an optical measuring head, are furthermore known. Devices of this type are configured to measure the measurement object in a non-contact manner. Although coordinate measuring machines of this type are highly accurate when determining a sensor position, a positioning of the sensors used requires a so-called "feedback" signal of the surface to be measured.

Devices and methods for measuring a roughness of the surface of the measurement object are furthermore known, for example from U.S. Pat. Nos. 7,339,679, 7,400,408, and 6,163,973. Skid sensing methods are furthermore known, for example, from DE 10 2007 017 664 A1. Known roughness sensors have a small working range of typically approximately 100 µm and—in the case of optical sensors—a small working distance of a similar order of magnitude. Furthermore, sensors of this type are sensitive to collisions. In particular, a sensor tip can easily be damaged. In coordinate measuring machines configured to carry out a roughness measurement of the surface of the measurement object in addition to determining a shape or a distance of the measurement object, the shape or the distance of the measurement object and the roughness of the surface of the measurement object are determined successively by exchange of the respective probes. This can lead to a long measurement duration.

SUMMARY

It is therefore an object of the present invention to provide a probing element and a coordinate measuring machine for measuring at least one measurement object which at least largely avoid the disadvantages of known devices and methods. In particular, the intention is to enable the measurement duration to be shortened, and to prevent damage to the sensor in the event of collisions.

The object is achieved by providing a probing element, a coordinate measuring machine, and a method for measuring at least one measurement object as described herein.

Hereinafter the terms "exhibit", "have", "comprise" or "include" or any grammatical deviations therefrom are used in a non-exclusive way. Accordingly, these terms can refer either to situations in which, besides the feature introduced by these terms, no further features are present, or to situations in which one or more further features are present. For example, the expression "A exhibits B", "A has B", "A comprises B" or "A includes B" can refer both to the situation in which no further element aside from B is provided in A (that is to say to a situation in which A is composed exclusively of B) and to the situation in which, in addition to B, one or more further elements are provided in A, for example element C, elements C and D, or even further elements.

Furthermore, it is pointed out that the terms "at least one" and "one or more" and grammatical modifications of these terms or similar terms, if they are used in association with one or more elements or features and are intended to express the fact that the element or feature can be provided singly or multiply, in general are used only once, for example when the feature or element is introduced for the first time. When the feature or element is subsequently mentioned again, the corresponding term "at least one" or "one or more" is generally no longer used, without restriction of the possibility that the feature or element can be provided singly or multiply.

Furthermore, hereinafter the terms "preferably", "in particular", "by way of example" or similar terms are used in conjunction with optional features, without alternative embodiments thereby being restricted. In this regard, features introduced by these terms are optional features, and there is no intention to restrict the scope of protection of the claims, and in particular of the independent claims, by these features. In this regard, the invention, as will be recognized by a person skilled in the art, can also be carried out using other configurations. In a similar way, features introduced by "in one embodiment of the invention" or by "in one exemplary embodiment of the invention" are understood as optional features, without the intention being thereby to restrict alternative configurations or the scope of protection of the independent claims. Furthermore, all possibilities of combining the features introduced by these introductory expressions with other features, whether optional or non-optional features, are intended to remain unaffected by said introductory expressions.

According to a first aspect of the present invention, a probing element for measuring at least one measurement object is provided. The probing element includes:

at least one first optical sensor configured to generate at least one first sensor signal depending on a fine shape of at least one surface of the measurement object;

at least one second sensor configured to generate at least one second sensor signal depending on a coarse shape of the measurement object and/or on a distance to the measurement object; wherein the first optical sensor has a first measurement region and the second sensor has a second measurement region, wherein the first optical sensor is at least partly integrated in the second sensor in such a way that the first measurement region and the second measurement region at least partly overlap.

The designations "first" or "second" should be understood as designations, and in particular to give no information of whether further elements are provided.

In the context of the present invention, a "probing element" can be understood to mean a basically arbitrarily shaped device which is configured to probe a measurement object with at least one touch and/or in a non-contact manner, for example optically. In this case, in the context of the present invention, a "measurement object" can generally be understood to mean an arbitrarily shaped object to be measured. By way of example, the measurement object can be selected from the group consisting of a test specimen, a workpiece to be measured, and a component to be measured. The measurement object, in particular the surface of the measurement object, can have great curvatures, i.e., small radii through to sharp edges. The measurement object can include a chip, in particular a microchip, having conductor track structures. Other measurement objects, however, are also conceivable.

In principle, a "first optical sensor" can be understood to mean an optical sensor configured to generate at least one sensor signal depending on a fine shape of the surface of the measurement object. In the context of the present invention, a "first optical sensor signal" can be understood to mean an arbitrary signal which is generated by the first optical sensor owing to an interaction with the measurement object and/or which is generated in reaction to the interaction with the measurement object. The first optical sensor signal can be, for example, an electronic signal. The electronic signal can be evaluated by at least one control and evaluation unit of a coordinate measuring machine, described further below, and information about the fine shape of the surface of the measurement object can thus be generated. "Fine shape" can be understood to mean a quantitative and/or qualitative measurement variable that characterizes a constitution and/or property of the surface of the measurement object, in particular an unevenness, for example a high-frequency unevenness, of a surface height. The fine shape can be an undulation and/or roughness of the at least one surface of the measurement object. "Coarse shape" can be understood to mean, in particular, a shape of the measurement object.

The first optical sensor can include a sensor that carries out non-contact and interferometric measurement, in particular a roughness sensor. "Carry out non-contact measurement" can be understood to mean that the first optical sensor is configured to determine the fine shape without tactilely probing the surface of the measurement object. In particular, the first optical sensor can be arranged at a distance from the surface of the measurement object. The first optical sensor can have at least one interferometer, for example at least one Michelson interferometer and/or at least one white light interferometer and/or at least one OCT as described for example in DE 102005061464 A1. The interferometer can be configured as an evaluation unit for the first optical sensor. It would also be conceivable to use a chromatic confocal sensor which, with regard to lateral (spot size) and also axial resolution (resulting in a small measurement region), can be designed in such a way that it is possible to detect the fine shape of the surface.

The first optical sensor can have at least one first illumination device configured to generate at least one first illumination light beam. An "illumination device" can be understood to mean a device configured to generate an illumination light beam. In the context of the present invention, "light" can be understood to mean electromagnetic radiation in at least one spectral range selected from the visible spectral range, the ultraviolet spectral range and the infrared spectral range. The term visible spectral range encompasses, in principle, a range of 380 nm to 780 nm. The term infrared (IR) spectral range encompasses, in principle, a range of 780 nm to 1000 µm, wherein the range of 780 nm to 1.4 µm is designated as near infrared (NIR), and the range of 15 µm to 1000 µm is designated as far infrared (FIR). The term ultraviolet encompasses, in principle, a spectral range of 100 nm to 380 nm. In the context of the present invention, visible light, that is to say light from the visible spectral range, or NIR is preferably used. The term "light beam" can be understood to mean, in principle, a quantity of light which is emitted and/or radiated in a specific direction. The light beam can be a beam of rays. The illumination device can have at least one light source. By way of example, the illumination device can have a multiplicity of identical or differently configured light sources. By way of example, the illumination device can have at least one laser light source and/or at least one light-emitting diode (LED).

The first optical sensor can have at least one first optical waveguide. "Optical waveguide" can be understood to mean a component configured to transmit a light beam. By way of example, the optical waveguide can include at least one optical fiber, in particular at least one monomode fiber and/or at least one multimode fiber. The first illumination device can be configured to couple the first illumination light beam into the first optical waveguide.

The first optical sensor can have at least one sensor head. A sensor head can be understood to mean a component of the sensor which is configured to interact with the measurement object. The first optical waveguide can be configured to couple the illumination light beam into the sensor head. The sensor head can be configured to illuminate the measurement object and to detect a measurement light beam reflected and/or backscattered from the measurement object. "To detect the reflected and/or backscattered measurement light beam" can be understood to mean receiving and/or detecting and/or capturing. The first optical sensor, in particular in the case of a sensor operating interferometrically, can have at least one reference surface and an associated beam splitter configured partly to direct the illumination light beam onto the reference surface and partly to transmit it for illuminating the measurement object. The sensor head can be configured to detect a reference light beam reflected at the reference surface and to couple it into the first optical waveguide. The first optical sensor can be configured to superimpose the reference light beam and the measurement light beam. The measurement light beam and the reference light beam can have a phase difference depending on a path length of a light path from the reference surface to the surface of the measurement object. The first optical sensor can be configured to determine the phase difference between the measurement light beam and the reference light beam. The control and evaluation unit of the coordinate measuring machine, described further below, can be configured to determine the information about the fine shape, in particular the roughness, from the phase difference.

A "second sensor" can be understood to mean a sensor configured to generate at least one second sensor signal depending on a coarse shape of the measurement object and/or on a distance to the measurement object. The second sensor is configured to generate the second sensor signal, for example an electronic signal. In the context of the present invention, a second sensor signal can be understood to mean an arbitrary signal which is generated by the second sensor owing to the interaction with the measurement object and/or which is generated in reaction to the interaction with the measurement object. The second sensor signal can be evaluated by the control and evaluation unit.

The first optical sensor has a first measurement region and the second sensor has a second measurement region. A "first measurement region", also called first working range, can be understood to mean a region, in particular a depth range, in which a detection and/or determination of the information about the fine shape are/is actually possible and/or possible within predefined and/or predeterminable measurement tolerances. The first measurement region can be delimited by a first measurement region beginning and a first measurement region end. The first measurement region beginning can be for example a first distance between the first optical sensor and the surface of the measurement object starting from which the first optical sensor begins to yield data within predefined and/or predeterminable measurement tolerances. The first measurement region beginning can be for example a shortest possible distance between the first optical sensor and a surface of the measurement object at which a measurement is possible within predefined and/or predeterminable measurement tolerances. The first measurement region end can be a second distance between the first optical sensor and the surface of the measurement object, at which the first optical sensor still yields data within predefined and/or predeterminable measurement tolerances, but with a further increase in the distance a measurement is no longer possible within predefined and/or predeterminable measurement tolerances. A "second measurement region", also called second working range, can be understood to mean a region, in particular a distance between the second optical sensor and the measurement object, in which a detection and/or determination of the information about the coarse shape and/or the distance are/is possible within predefined and/or predeterminable measurement tolerances. The second measurement region can be punctiform. By way of example, in the case of a configuration as a tactile sensor as described below, the measurement region can be a point of contact between the tactile sensor and the measurement object. The second measurement region can be delimited by a second measurement region beginning and a second measurement region end. The second measurement region beginning can be for example a first distance between the second sensor and the surface of the measurement object starting from which the second sensor begins to yield data within predefined and/or predeterminable measurement tolerances. The second measurement region beginning can be for example a shortest possible distance between the second sensor and the surface of the measurement object at which a measurement is possible within predefined and/or predeterminable measurement tolerances. The second measurement region end can be a second distance between the second optical sensor and the surface of the measurement object, at which the second sensor still yields data within predefined and/or predeterminable measurement tolerances, but with a further increase in the distance, a generation of data is no longer possible within predefined and/or predeterminable measurement tolerances. By way of example, in the case of a configuration as a chromatic confocal sensor as described below, the second measurement region beginning can be a first focal point of a first wavelength and the measurement region end can be a second focal point of a second wavelength.

The first optical sensor is at least partly integrated in the second sensor in such a way that the first measurement region and the second measurement region at least partly overlap. "At least partly overlap" can be understood to mean exemplary embodiments in which the first and the second measurement regions overlap completely or only partly. By way of example, as described above, in the case of a configuration as tactile sensor, the second measurement region can be a point of contact between the tactile sensor and the measurement object. The point of contact can lie in the first measurement region of the first optical sensor. By way of example, as described above, the second measurement region can be a measurement region of a chromatic confocal sensor and the first measurement region can lie in the measurement region of the chromatic confocal sensor. An overlap can be provided in the measurement direction, wherein perpendicular to the measurement direction the measurement regions, i.e., the measurement locations on the surface, can have an offset.

In one exemplary embodiment, the second sensor can have at least one tactile sensor having at least one tactile probe element. In the context of the present invention, a "tactile probe element" can be understood to mean a device configured to interact with the surface of the measurement object, for example mechanically, and to generate information about a probing point. In particular, the tactile probe element can probe the measurement object at the at least one probing point. "Probe tactilely" and "sense tactilely" can be understood to mean an interaction of the tactile probe element with the measurement object which, in addition to the customary use of the term "tactilely", can also be carried out in a non-contact manner. By way of example, the tactile probe element can touch the surface of the measurement object, for example by the surface of the measurement object being brought into contact with a surface of the tactile probe element, and/or the tactile probe element can interact with the surface of the measurement object in a non-contact manner, for example capacitively. During the interaction, the surface of the tactile probe element and the surface of the measurement object can touch one another. Moreover, the surface of the tactile probe element and the surface of the measurement object can make electrical contact with one another. Alternatively, the interaction can be non-contact, for example inductive or capacitive. The tactile probe element can be configured as a probe. By way of example, the tactile probe element can be a tactile probe element that carries out mechanical and/or inductive and/or capacitive measurement. The tactile probe element can have a surface. The tactile probe element can be configured to probe the measurement object tactilely at the at least one probing point with the surface of the tactile probe element. In the context of the present invention a "probing point" can be understood to mean a point, a location or an area on the surface of the measurement object which is at the smallest distance between the measurement object and the surface of the tactile probe element. In particular, the probing point can be a point of contact between the surface of the tactile probe element and the surface of the measurement object. A coordinate system of the tactile probe element can be for example a Cartesian coordinate system or a spherical coordinate system. Other coordinate systems are also conceivable. An origin or zero point of the coordinate system can be at a center, for example, a midpoint of the ball in the case of a probe ball as tactile probe element. By way of example, the probing point can be a point in the coordinate system of the tactile probe element.

The tactile probe element can have at least one probe shaft and a probe head. The probe head can have at least one probe ball. The probe ball can be composed of an at least partly transparent material. By way of example, the probe ball can include a ruby ball. However, other forms are also conceivable. The probe shaft can be configured to secure the probe head to the coordinate measuring machine. The second sensor can have an adapter for connecting the second sensor to a further device, for example the coordinate measuring machine. A "probe shaft" can be understood to mean a basically arbitrarily configured securing element on which the probe head is arranged. The probe shaft can be a cylindrical shaft. The probe shaft can be configured as a tube; in particular, the shaft can be hollow. The probe shaft can have a length of less than 50 mm. A shaft length can be in the range of 20 to 240 mm. This range can also be undershot and/or exceeded for specific measurement tasks. The probe shaft can extend substantially perpendicularly to a support on which the measurement object is arranged, deviations from a perpendicular alignment being possible within the scope of component tolerances. The probe head can be rotatable; in particular, the probe shaft and/or the probe head can be mounted rotatably about a rotation axis.

The first optical sensor can be at least partly integrated in the tactile probe element. "At least partly integrated" can be understood to mean that at least one component of the first optical sensor is arranged in the tactile probe element, in particular in the second sensor. By way of example, the probe ball can have at least one hole in which the first optical sensor is at least partly arranged. By way of example, the first optical waveguide can be introduced into the hole in the probe ball. By way of example, the at least one first optical waveguide can be at least partly arranged in the probe shaft and/or the sensor head can be at least partly arranged in the probe ball. The hole can include at least one hole selected from the group consisting of: at least one through hole parallel to an extension direction of the probe shaft, at least one through hole perpendicular to the extension direction of the probe shaft, at least one blind hole parallel to the extension direction of the probe shaft, at least one blind hole perpendicular to the extension direction of the probe shaft. The hole can be arranged parallel to the extension direction of the probe shaft or perpendicular to the extension direction of the probe shaft. The hole can be arranged off-axis with respect to an axis through a midpoint of the probe head. Off-axis can be understood to mean that an axis through the hole in the direction of an extension direction of the hole is displaced parallel to an axis through the midpoint of the probe head. In particular, a position of the hole in the probe ball can be different from the probing point. In this regard, it is possible to prevent measurement deviations as a result of the drill hole at the probing point. A measurement position of the first optical sensor and a measurement position of the second optical sensor can be arranged as close to one another as possible in order to reduce deviations during an evaluation of the sensor signals and not to restrict accessibilities.

In the case of a configuration as through hole, the first optical sensor can be configured to illuminate the measurement object directly. In the case of a configuration as blind hole, the first optical sensor can be configured to measure the measurement object through a remaining material of the probe ball. In particular, a surface of the probe ball can be configured as a reference surface of the first optical sensor. By way of example, in the case of a configuration as blind hole, the hole can be filled with a liquid, for example an immersion medium. The liquid can have a refractive index corresponding to a refractive index of the probe ball. "Correspond to a refractive index of the probe ball" can be understood to mean that the liquid has a refractive index identical to that of the probe ball, deviations of the refractive indices of less than or equal to 0.3, typically less than or equal to 0.1, being possible. An integration into the probe ball allows the first optical sensor to be protected against mechanical collisions. Furthermore, the second sensor, at the same time as the detection of the fine shape by the first optical sensor, supplies at least one regulation signal required for the control and evaluation unit of the coordinate measuring machine for a positioning at the measurement object in order to keep the first optical sensor at the correct working distance. A working distance can be understood to mean a predetermined and/or settable distance between the first optical sensor and the measurement object at which a measurement is intended to be carried out. The working distance can lie in the first measurement region.

In one exemplary embodiment, the second sensor can have at least one chromatic confocal sensor. A measurement principle of chromatic confocal sensors is described in U.S. Pat. No. 5,785,651 A, for example. A confocal chromatic sensor can be understood to mean, in principle, an optical sensor which has at least one confocal chromatic beam path. In the context of the present invention, the term "beam path" can be understood to mean a course of light beams through optical elements. In the context of the present invention, a "confocal chromatic beam path" can be understood to mean a beam path in which an illumination beam path and a detection beam path are confocal for at least one wavelength of an illumination light beam. In particular, for at least one wavelength of the illumination light beam the condition can be met that a first focus is situated at an intended location on the surface of the measurement object and at the same time a second focus is situated at a point in the center of a stop element which is arranged upstream of a sensor element in a direction of propagation of a light beam reflected from the measurement object. In particular, the confocal chromatic sensor can be a non-contact distance sensor or can be used in a non-contact distance sensor. The confocal chromatic sensor can be configured to measure an extensive, in particular non-punctiform, surface of the measurement object. In particular, the confocal chromatic sensor can be a chromatic area or line sensor and/or a chromatic scanning point sensor.

The second sensor can have at least one second illumination device configured to generate at least one second illumination light beam. The second illumination device can be configured identically to or differently from the first illumination device. The second illumination device can be integrated in the first illumination device. The second illumination device can be identical to the first illumination device. The second sensor can have at least one second optical waveguide. The second optical waveguide can include at least one monomode fiber and/or at least one multimode fiber. The second illumination device can be configured to couple the second illumination light beam into the second optical waveguide. The second sensor can have at least one optical element configured to focus the second illumination light beam depending on a wavelength of the second illumination light beam at different distances within the second measurement region with respect to the optical element. The first optical waveguide and the second optical waveguide can be arranged parallel to one another. By way of example, the first and second optical waveguides can be arranged parallel and/or alongside one another. A fiber end of the first optical waveguide can be arranged parallel to a fiber end of the second optical waveguide. The optical element can be configured to focus the first illumination light beam at at least one focal point, wherein the focal point is arranged within the second measurement region. The first optical sensor can be integrated into the chromatic confocal sensor in such a way that the fiber end of the first optical waveguide is arranged parallel to the fiber end of the second optical waveguide upstream of a sensor optical unit and is likewise imaged onto the surface of the measurement object by the sensor optical unit. The probing element and/or the coordinate measuring machine can be configured to coordinate and/or adapt a focal position of the first optical sensor in relation to the working range of the chromatic confocal sensor, for example by axial displacement of the fiber ends relative to one another. The probing element, in particular the sensor optical unit, can have at least one beam splitter configured to split the first illumination light beam into a measurement beam path and a reference beam path. The beam splitter can be correspondingly selectively coordinated with working wavelengths of the first optical sensor and/or of the second sensor. By way of example, the beam splitter can have a reflectivity of 50% for a working wavelength, for example 1.5 µm, of the first optical sensor and have a transmission of approximately 100% for a working wavelength of the second sensor, for example, a wavelength of from 400 nm up to 800 nm. The control and evaluation unit can have at least one spectrometer. The second sensor can be configured to image a second light beam reflected from the measurement object onto the second optical waveguide. The second optical waveguide can be configured to guide the second reflected light beam to the spectrometer. The spectrometer can be configured to evaluate the second reflected light beam with respect to the wavelength and to generate the information about the coarse shape of the measurement object and/or about the distance to the measurement object.

According to a further aspect of the present invention, a coordinate measuring machine for measuring at least one measurement object is provided. A coordinate measuring machine can be understood to mean a device configured to measure at least one coordinate of the measurement object. The coordinate measuring machine can be a gantry-type measuring machine or a bridge-type measuring machine. The coordinate measuring machine can have a support, in particular a measurement table, on which the measurement object can be arranged. The coordinate measuring machine can have at least one gantry which has at least one first vertical column, at least one second vertical column, and a cross beam which connects the first vertical column and the second vertical column. At least one vertical column selected from the first and second vertical columns can be mounted on a main body, for example the measurement table, in a manner movable in a horizontal direction by a guide. The horizontal direction can be a direction along a y-axis. The coordinate measuring machine can have a coordinate system, for example, a Cartesian coordinate system or a spherical coordinate system. Other coordinate systems are also conceivable. An origin or zero point of the coordinate system can be defined, for example, by a sensor of the coordinate measuring machine. By way of example, a guide can extend horizontally along the y-axis and be configured to move the gantry and/or the at least one column of the gantry linearly, along the y-axis. An x-axis can extend perpendicular to the y-axis, in a plane of the supporting surface of the main body. A z-axis can extend perpendicular to the plane of the supporting surface, in a vertical direction. The vertical columns can extend along the z-axis. The cross beam can extend along the x-axis.

The coordinate measuring machine can have at least one measuring slide which is mounted so as to be movable along the cross beam. A measuring slide can be understood generally to mean a slide which is configured to accommodate at least one sensor directly or via further components. In the measuring slide, there can be mounted a sleeve which is movable in a vertical direction, for example, along the z-axis. A sensor, which can be used to sense the surface of the measurement object, can be arranged at a lower end, in particular at an end facing in the direction of the supporting surface of the sleeve.

The coordinate measuring machine includes at least one probing element, the probing element including:
at least one first optical sensor configured to generate at least one first sensor signal depending on a fine shape of at least one surface of the measurement object,
at least one second sensor configured to generate at least one second sensor signal depending on a coarse shape of the measurement object and/or on a distance to the measurement object,
at least one control and evaluation unit configured to control the first optical sensor and the second sensor and to generate at least one item of information about the fine shape of the at least one surface of the measurement object from the first optical sensor signal and to generate at least one item of information about the coarse shape of the measurement object and/or about the distance to the measurement object from the second sensor signal.

The first optical sensor has a first measurement region and the second sensor has a second measurement region. The first optical sensor is at least partly integrated in the second sensor in such a way that the first measurement region and the second measurement region at least partly overlap.

The coordinate measuring machine can be configured, in particular, to simultaneously detect the information about the fine shape and the information about the coarse shape of the measurement object and/or about the distance to the measurement object. "Simultaneously detect" can be understood to mean that a detection of the information about the fine shape and the information about the coarse shape of the measurement object and/or about the distance to the measurement object can be carried out within a single positioning of the probe, in particular that it is not necessary to carry out a probe exchange or downstream measurement, for example, a downstream shape check after a roughness measurement. The first optical sensor signal and the second sensor signal can be captured at identical points in time, or at different points in time, for example, successively.

The control and evaluation unit can be configured to generate at least one item of information about the fine shape of the at least one surface of the measurement object from the first optical sensor signal. "Generating information from the first optical sensor signal" can be understood to mean determining the information from the first optical sensor signal and/or evaluating the first optical sensor signal. A control and evaluation unit can be understood to mean a device configured to drive the first optical sensor and/or the second sensor and/or further components of the coordinate measuring machine and to evaluate signals generated by the first optical sensor and/or by the second sensor. "Information about the fine shape of the at least one surface of the measurement object" can be understood to mean, in principle, arbitrary information about the fine shape, for example a surface height at at least one measurement point and/or an average roughness and/or a root-mean-square roughness and/or an averaged roughness and/or a laterally highly resolved surface profile, i.e., more highly resolved than occurs by the second sensor or in the context of the shape detection. Moreover, the control and evaluation unit can be designed such that the control and in particular regulation of the machine and the movement axes thereof takes place on the measurement signal of the second, shape-detecting sensor. By way of example, for this purpose provision can be made of one or more electronic connections between the first optical sensor and the control and evaluation unit. The control and evaluation unit can include for example at least one data processing device, for example at least one computer or microcontroller. The data processing device can have one or more volatile and/or non-volatile data memories, wherein the data processing device may, for example, be configured, in terms of programming technology, to drive the sensor. The control and evaluation unit can furthermore include at least one interface, for example an electronic interface and/or a human-machine interface such as, for example, an input/output device such as a display and/or a keyboard and/or an operating console.

The control and evaluation unit can be configured to generate the information about the coarse shape of the measurement object and/or about the distance to the measurement object from at least one item of information about the probing point. Information about the coarse shape of the measurement object can be understood to mean, in principle, arbitrary information about the coarse shape, in particular the shape, of the measurement object, for example about a shape of an edge and/or outer contour and/or area. Information about the distance to the measurement object can be understood to mean, in principle, arbitrary information about the distance to the measurement object, for example a height coordinate. Information about the probing point can be understood to mean, for example, a coordinate of a point of contact on the surface of the tactile probe element and/or on the surface of the measurement object and/or a position of the measurement object and/or coordinates of the measurement object in the coordinate system of the second sensor.

With regard to further exemplary embodiments and definitions of the coordinate measuring machine, reference can be made to the above description of the probing element.

According to a further aspect of the invention, a method for measuring at least one measurement object is provided. A coordinate measuring machine according to the invention is used in the method. The method includes the following steps:

generating at least one first optical sensor signal depending on a fine shape of at least one surface of the measurement object by at least one first optical sensor, generating at least one second sensor signal depending on a coarse shape of the measurement object and/or on a distance to the measurement object by at least one second sensor, wherein the first optical sensor has a first measurement region and the second sensor has a second measurement region, wherein the first optical sensor is at least partly integrated in the second sensor in such a way that the first measurement region and the second measurement region at least partly overlap, and generating at least one item of information about the fine shape of the at least one surface of the measurement object from the first optical sensor signal and at least one item of information about the coarse shape of the measurement object and/or about the distance to the measurement object from the second sensor signal by at least one control and evaluation unit.

With regard to exemplary embodiments and definitions, reference can be made to the above description of the probing element and of the coordinate measuring machine. The method steps can be carried out in the order indicated, wherein one or more of the steps can at least in part also be carried out simultaneously, and wherein one or more steps can be repeated multiple times. Furthermore, further steps can additionally be performed independent of whether or not they are mentioned in the present application.

According to a further aspect of the present invention, a method for regulating a movement of a coordinate measuring machine is provided. A coordinate measuring machine according to the invention is used in the method. The method includes the following steps:

generating at least one first optical sensor signal depending on a fine shape of at least one surface of the measurement object by at least one first optical sensor, generating at least one second sensor signal depending on a coarse shape of the measurement object and/or on a distance to the measurement object by at least one second sensor, wherein the first optical sensor has a first measurement region and the second sensor has a second measurement region, wherein the first optical sensor is at least partly integrated in the second sensor in such a way that the first measurement region and the second measurement region at least partly overlap, and regulating a movement of the coordinate measuring machine and/or a probing element of the coordinate measuring machine along the surface of the measurement object on the basis of the second sensor signal.

With regard to exemplary embodiments and definitions, reference can be made to the above description of the probing element and of the coordinate measuring machine. The method steps can be carried out in the order indicated, wherein one or more of the steps can at least in part also be carried out simultaneously, and wherein one or more steps can be repeated multiple times. Furthermore, further steps can additionally be performed independent of whether or not they are mentioned in the present application.

The devices according to the aspects of the invention and the method according to the aspects of the invention are advantageous vis-à-vis known methods and devices. A probe exchange between a roughness measurement and shape or distance measurement can be obviated. A measurement duration can thus be reduced. Furthermore, the second sensor allows a rapid positioning of the first optical sensor. Collision protection can also be made possible by the integration of the first optical sensor into the second sensor. Furthermore, the regulation of the coordinate measuring machine is made simpler if it is carried out on the data of the second sensor since the latter firstly includes a larger measurement region, and is generally suitable for providing data for the regulation of a coordinate measuring machine.

In summary, in the context of the present invention, the following exemplary embodiments are provided:

Exemplary Embodiment 1

Probing element for measuring at least one measurement object comprising:
at least one first optical sensor configured to generate at least one first sensor signal depending on a fine shape of at least one surface of the measurement object,
at least one second sensor configured to generate at least one second sensor signal depending on a coarse shape of the measurement object and/or on a distance to the measurement object, wherein the first optical sensor has a first measurement region and the second sensor has a second measurement region, wherein the first optical sensor is at least partly integrated in the second sensor in such a way that the first measurement region and the second measurement region at least partly overlap.

Exemplary Embodiment 2

Probing element according to the preceding exemplary embodiment, wherein the first optical sensor includes a sensor that carries out non-contact and interferometric measurement, wherein the first optical sensor has at least one interferometer.

Exemplary Embodiment 3

Probing element according to either of the preceding exemplary embodiments, wherein the first optical sensor has at least one first illumination device configured to generate at least one first illumination light beam, wherein the first optical sensor has at least one first optical waveguide, and wherein the first illumination device is configured to couple the first illumination light beam into the first optical waveguide.

Exemplary Embodiment 4

Probing element according to the preceding exemplary embodiment, wherein the first optical sensor has at least one sensor head, wherein the first optical waveguide is configured to couple the illumination light beam into the sensor head, and wherein the sensor head is configured to illuminate the measurement object and to detect a measurement light beam reflected and/or backscattered from the measurement object.

Exemplary Embodiment 5

Probing element according to any of the preceding exemplary embodiments, wherein the first optical sensor has at least one reference surface configured to partly reflect the first illumination light beam, wherein the sensor head is configured to detect a reference light beam reflected at the reference surface and to couple it into the first optical waveguide, and wherein the first optical sensor is configured to determine a phase difference between the measurement light beam and the reference light beam.

Exemplary Embodiment 6

Probing element according to any of the preceding exemplary embodiments, wherein the second sensor has at least one tactile sensor having at least one tactile probe element, wherein the tactile probe element has a sensor surface, and wherein the tactile probe element is configured to probe the measurement object tactilely at at least one probing point on a surface of the measurement object.

Exemplary Embodiment 7

Probing element according to the preceding exemplary embodiment, wherein the first optical sensor is at least partly integrated in the tactile probe element, wherein the tactile probe element has at least one probe shaft and a probe head, wherein the probe head has at least one probe ball, wherein the at least one first optical waveguide is at least partly arranged in the probe shaft and/or the sensor head is at least partly arranged in the probe ball.

Exemplary Embodiment 8

Probing element according to the preceding exemplary embodiment, wherein the probe ball has at least one hole, selected from the group consisting of: at least one through hole parallel to an extension direction of the probe shaft, at least one through hole perpendicular to the extension direction of the probe shaft, at least one blind hole parallel to the extension direction of the probe shaft, and at least one blind hole perpendicular to the extension direction of the probe shaft.

Exemplary Embodiment 9

Probing element according to the preceding exemplary embodiment, wherein the hole is a blind hole, wherein the blind hole is filled with a liquid, and wherein the liquid has a refractive index corresponding to a refractive index of the probe ball.

Exemplary Embodiment 10

Probing element according to any of the exemplary preceding embodiments, wherein the second sensor includes at least one chromatic confocal sensor.

Exemplary Embodiment 11

Probing element according to the preceding exemplary embodiment, wherein the second sensor has at least one second illumination device configured to generate at least one second illumination light beam, wherein the second sensor has at least one second optical waveguide, wherein the second illumination device is configured to couple the second illumination light beam into the second optical waveguide, wherein the second sensor has at least one optical element configured to focus the second illumination light beam depending on a wavelength of the second illumination light beam at different distances within the second measurement region with respect to the optical element, wherein the first optical waveguide and the second optical waveguide are arranged parallel to one another, wherein a fiber end of the first optical waveguide is arranged parallel to a fiber end of the second optical waveguide, wherein the optical element is configured to focus the first illumination light beam at at least one focal point, and wherein the focal point is arranged within the second measurement region.

Exemplary Embodiment 12

Probing element according to any of the preceding exemplary embodiments, wherein the second sensor has at least one spectrometer.

Exemplary Embodiment 13

Coordinate measuring machine for measuring at least one measurement object, wherein the coordinate measuring machine has at least one probing element, the probing element comprising:
at least one first optical sensor configured to generate at least one first sensor signal depending on a fine shape of at least one surface of the measurement object,
at least one second sensor configured to generate at least one second sensor signal depending on a coarse shape of the measurement object and/or on a distance to the measurement object,
at least one control and evaluation unit configured to control the first optical sensor and the second sensor and to generate at least one item of information about the fine shape of the at least one surface of the measurement object from the first optical sensor signal and to generate at least one item of information about the coarse shape of the measurement object and/or about the distance to the measurement object from the second sensor signal, wherein the first optical sensor has a first measurement region and the second sensor has a second measurement region, and wherein the first optical sensor is at least partly integrated in the second sensor in such a way that the first measurement region and the second measurement region at least partly overlap.

Exemplary Embodiment 14

Coordinate measuring machine according to the preceding exemplary embodiment, wherein the coordinate measuring machine is configured to simultaneously detect the information about the fine shape and the information about the coarse shape of the measurement object and/or about the distance to the measurement object.

Exemplary Embodiment 15

Method for measuring at least one measurement object by a coordinate measuring machine according to any of the preceding exemplary embodiments relating to a coordinate measuring machine, wherein the method includes the following steps:

generating at least one first optical sensor signal depending on a fine shape of at least one surface of the measurement object by at least one first optical sensor;
generating at least one second sensor signal depending on a coarse shape of the measurement object and/or on a distance to the measurement object by at least one second sensor, wherein the first optical sensor has a first measurement region and the second sensor has a second measurement region, and wherein the first optical sensor is at least partly integrated in the second sensor in such a way that the first measurement region and the second measurement region at least partly overlap, and
generating at least one item of information about the fine shape of the at least one surface of the measurement object from the first optical sensor signal and at least one item of information about the coarse shape of the measurement object and/or about the distance to the measurement object from the second sensor signal by at least one control and evaluation unit.

Exemplary Embodiment 16

Method for regulating a movement of a coordinate measuring machine, wherein a coordinate measuring machine according to any of the preceding exemplary embodiments relating to a coordinate measuring machine is used, wherein the method includes the following steps:

generating at least one first optical sensor signal depending on a fine shape of at least one surface of a measurement object by at least one first optical sensor,
generating at least one second sensor signal depending on a coarse shape of the measurement object and/or on a distance to the measurement object by at least one second sensor, wherein the first optical sensor has a first measurement region and the second sensor has a second measurement region, and wherein the first optical sensor is at least partly integrated in the second sensor in such a way that the first measurement region and the second measurement region at least partly overlap, and
regulating a movement of the coordinate measuring machine and/or a probing element of the coordinate measuring machine along the surface of the measurement object on the basis of the second sensor signal.

BRIEF DESCRIPTION OF THE DRAWINGS

The invention will now be described with reference to the drawings wherein.

DESCRIPTION OF EXEMPLARY EMBODIMENTS

Figure 4:
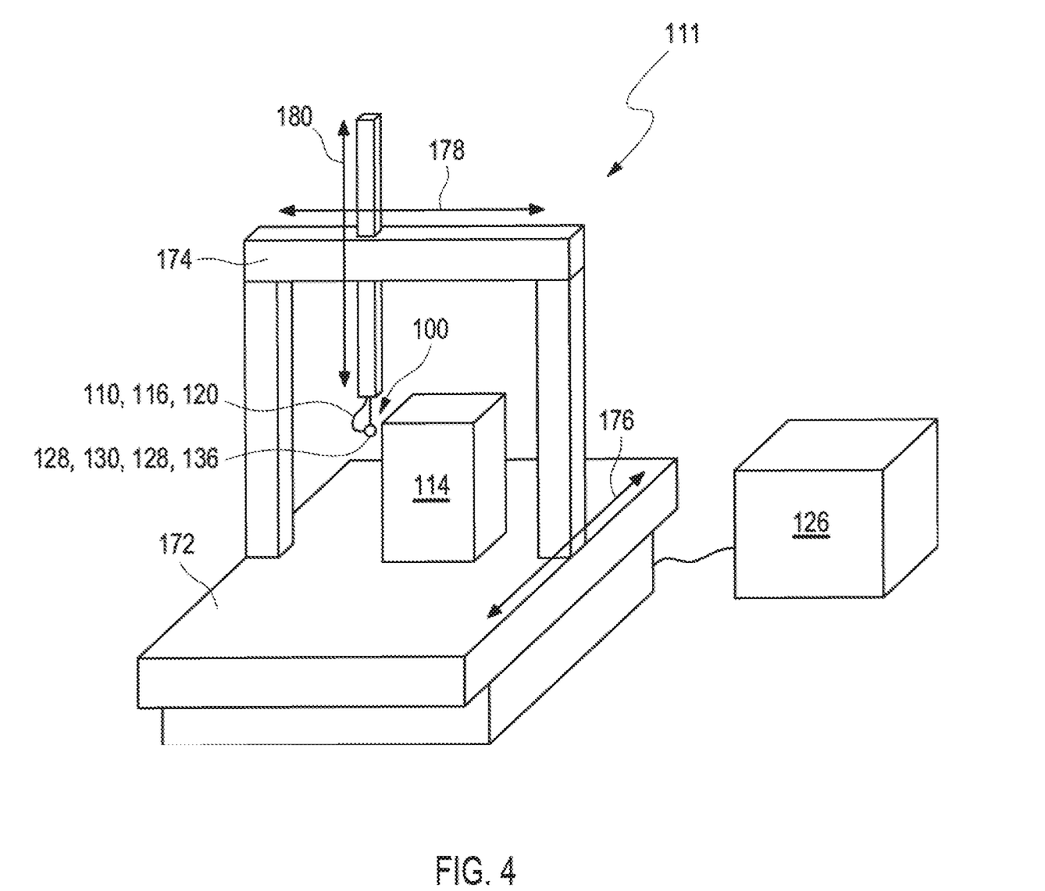
FIG. 4 shows a coordinate measuring machine and a schematic illustration of a first measurement region according to an exemplary embodiment the invention.

FIGS. 1A to 1D show a schematic illustration of exemplary embodiments of a first optical sensor 110 of a probing element 100 of a coordinate measuring machine 111, for example one as shown in FIG. 4. The first optical sensor 110 is configured to generate at least one first sensor signal depending on a fine shape of at least one surface 112 of a measurement object 114. By way of example, the measurement object 114 can be selected from the group consisting of a test specimen, a workpiece to be measured, and a component to be measured. The measurement object 114, in particular the surface 112 of the measurement object 114, can have great curvatures, i.e., small radii up to sharp edges. The measurement object 114 can includes a chip, in particular a microchip, with conductor track structures. However, other measurement objects 114 are also conceivable.

The first optical sensor 110 can generate the first optical sensor signal owing to an interaction with the measurement object 114 and/or in reaction to the interaction with the measurement object 114. The first optical sensor signal can be an electronic signal, for example. The first optical sensor 110 can include a sensor 116 that carries out non-contact and interferometric measurement. The first optical sensor 110 can have at least one interferometer 118, for example at least one Michelson interferometer and/or at least one white light interferometer and/or an OCT. The first optical sensor 110 can be evaluated by an evaluation unit having the interferometer 118 and/or further units, such as a spectrometer, for example. A use of a chromatic confocal sensor is also conceivable.

The first optical sensor 110 can have at least one first illumination device (not illustrated here) configured to generate at least one first illumination light beam. The first optical sensor 110 can have at least one first optical waveguide 120. By way of example, the optical waveguide 120 can include at least one optical fiber, in particular at least one monomode fiber and/or at least one multimode fiber. The optical fiber can also include coupling locations for connection or for, for example automated, change of the sensor at the coordinate measuring machine (CMM). The first illumination device can be configured to couple the first illumination light beam into the first optical waveguide 120.

The first optical sensor 110 can have at least one sensor head 122. The first optical waveguide 120 can be configured to couple the illumination light beam into the sensor head 122. The sensor head 122 can be configured to illuminate the measurement object 114 and to detect a measurement light beam reflected or scattered from the measurement object 114. The first optical sensor 110 can have at least one reference surface 124 and a beam splitter configured partly to reflect the illumination light beam onto, e.g., the reference surface and partly to transmit said illumination light beam for illuminating the measurement object 114. The sensor head can also be configured such that beam splitter and reference surface coincide on one surface. The sensor head 122 can be configured to detect a reference light beam reflected at the reference surface 124 and to couple it into the first optical waveguide 120. The first optical sensor 110 can be configured to superimpose the reference light beam and the measurement light beam. The measurement light beam and the reference light beam can have a phase difference depending on a path length of a light path from the reference surface 124 to the surface 112 of the measurement object 114. The first optical sensor 110 can be configured to determine the phase difference between the measurement light beam and the reference light beam.

Figure 2:
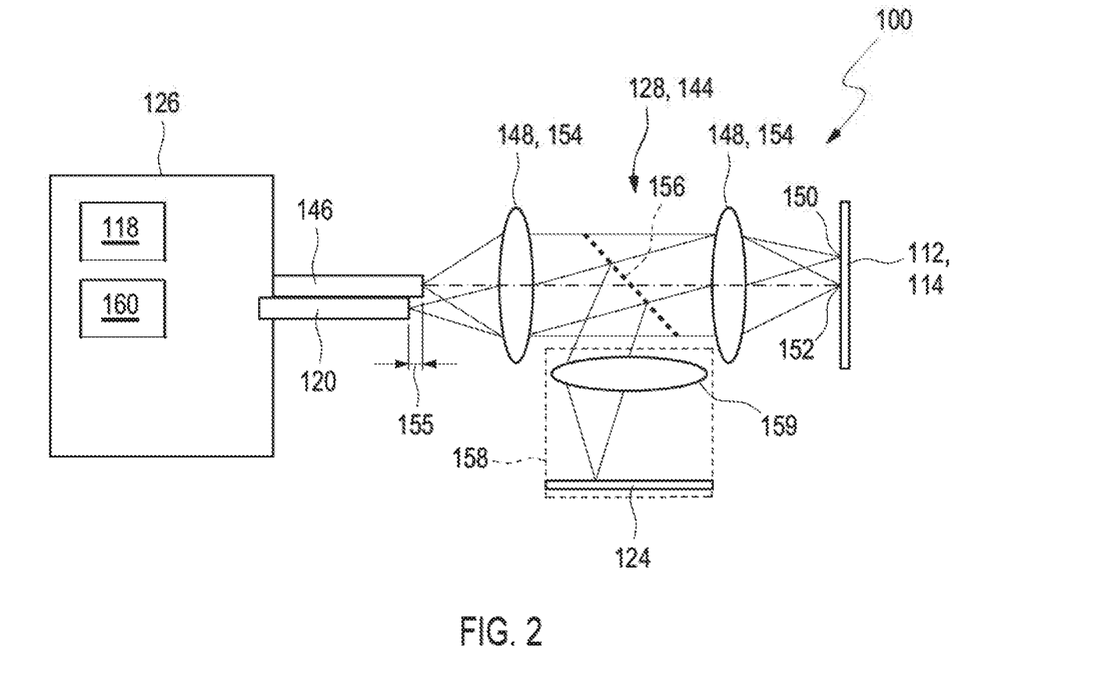
FIG. 2 shows a schematic illustration of a further exemplary embodiment of the first optical sensor and of the second sensor and of a control and evaluation unit.

The coordinate measuring machine 111 includes a control and evaluation unit 126, for example shown in FIG. 2, which is configured to control the first optical sensor and to generate at least one item of information about the fine shape of the at least one surface 112 of the measurement object 114 from the first optical sensor signal. The control and evaluation unit 126 can be configured to determine the information about the fine shape from the phase difference. By way of example, provision can be made of one or more electronic connections between the first optical sensor 110 and the control and evaluation unit 126. The control and evaluation unit 126 can include for example, at least one data processing device and at least one computer or microcontroller. The data processing device can have one or more volatile and/or non-volatile data memories, wherein the data processing device can be configured, in terms of programming technology, to drive the sensor. The control and evaluation unit 126 can furthermore include at least one interface, for example an electronic interface and/or a human-machine interface such as, for example, an input/output device such as a display and/or a keyboard and/or an operating console.

The probing element 100 includes at least one second sensor 128 configured to generate at least one second sensor signal depending on a coarse shape of the measurement object 114 and/or on a distance to the measurement object 114. The control and evaluation unit 126 is configured to control the second sensor 128 and to generate at least one item of information about the coarse shape of the measurement object 114 and/or about the distance to the measurement object 114 from the second sensor signal.

In the exemplary embodiments shown in FIGS. 1A to 1D, the second sensor 128 can include at least one tactile sensor 130 having at least one tactile probe element 132. In particular, the tactile probe element 132 can probe the measurement object 114 at at least one probing point. By way of example, the tactile probe element 132 can touch the surface 112 of the measurement object 114, for example by the surface 112 of the measurement object 114 being brought into contact with a surface of the tactile probe element 132, and/or the tactile probe element 132 can interact with the surface 112 of the measurement object 114 in a non-contact manner, for example capacitively. During the interaction, the surface of the tactile probe element 132 and the surface 112 of the measurement object 114 can touch one another. In particular, the surface of the tactile probe element 132 and the surface 112 of the measurement object 114 can make electrical contact with one another. Alternatively, the interaction can be non-contact, for example inductive or capacitive. The control and evaluation unit 126 can be configured to generate the information about the coarse shape of the measurement object 114 and/or about the distance to the measurement object 114 from at least one item of information about the probing point.

The tactile probe element 132 can have at least one probe shaft 134 and a probe head 136. The probe head 136 can have at least one probe ball. The probe ball can be composed of an at least partly transparent material. By way of example, the probe ball can include a ruby ball. However, other forms are also conceivable. The probe shaft 134 can be configured to secure the probe head 136 to the coordinate measuring machine 111. The second sensor 128 can have an adapter for connecting the second sensor 128 to a further device, for example the coordinate measuring machine 111. The probe shaft 134 can be configured as a tube; in particular, the shaft can be hollow. The probe shaft 134 can have a length of less than 50 mm. A shaft length can be in the range of 20 to 240 mm. This range can also be undershot and/or exceeded for specific measurement tasks. The probe shaft 134 can extend substantially perpendicular to a support on which the measurement object 114 is arranged, deviations from a perpendicular alignment being possible within the scope of component tolerances. The probe head 136 can be rotatable; in particular, the probe shaft 134 and/or the probe head 136 can be mounted rotatably about a rotation axis.

Figure 1A:
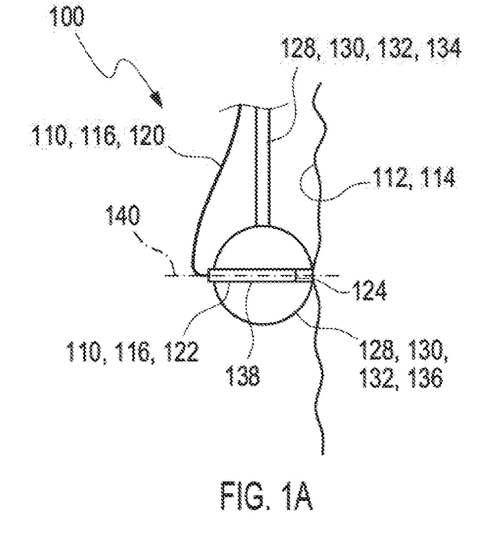
FIGS. 1A to 1D show schematic illustrations of exemplary embodiments of a first optical sensor and second sensor.
Figures 1B, 1D:
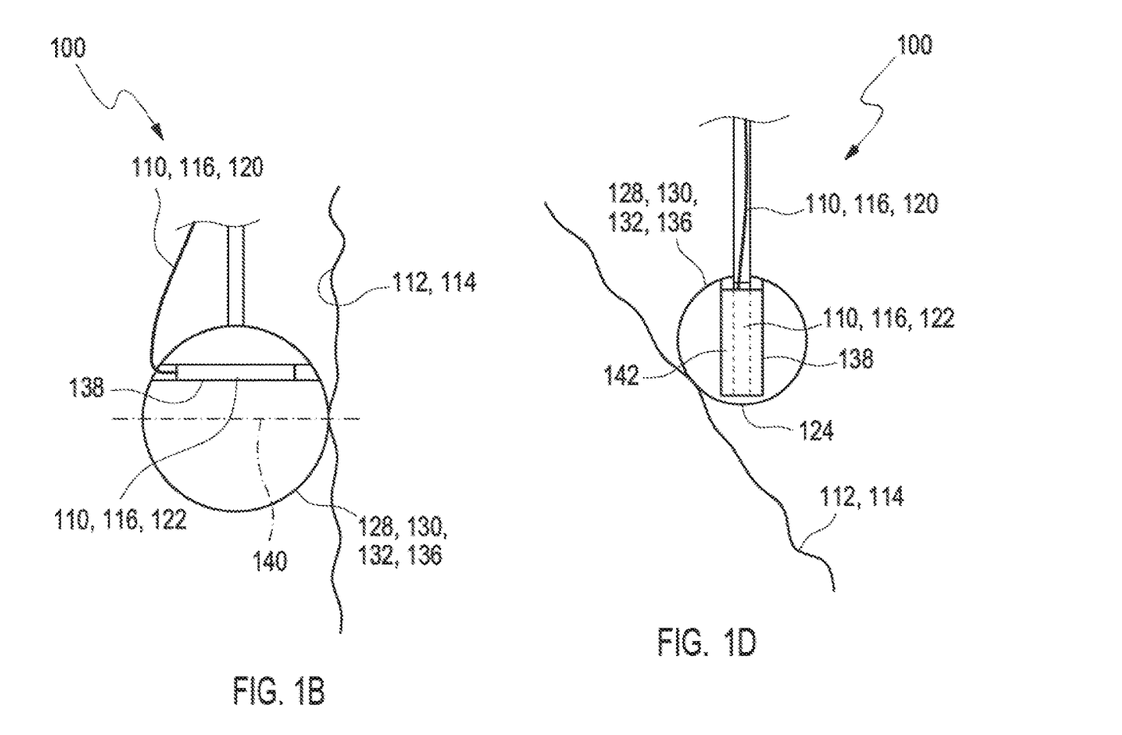
Figure 1C:
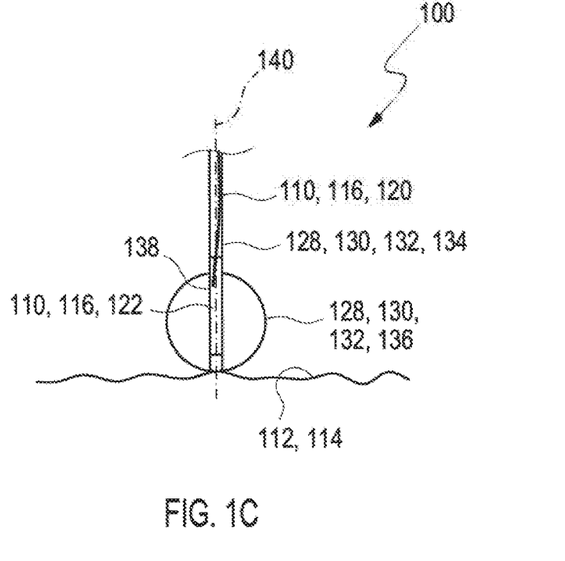

The first optical sensor 110 can be at least partly integrated in the tactile probe element 132. By way of example, the probe ball can have at least one hole 138 in which the first optical sensor 110 is at least partly arranged. By way of example, the first optical waveguide 120 can be introduced into the hole 138 in the probe ball. By way of example, the at least one first optical waveguide 120 can be at least partly arranged in the probe shaft 134 and/or the at least one sensor head 122 can be at least partly arranged in the probe ball. In FIGS. 1A and 1B, the hole 138 is configured as a through hole perpendicular to an extension direction of the probe shaft 134, in which the sensor head 122 is arranged. The sensor head 122 can be configured to illuminate the measurement object 114 directly and to detect a reflected light beam. In the exemplary embodiment shown in FIG. 1A, the through hole can be arranged axially with respect to an axis 140 through a midpoint of the ball. Typically, the through hole can be arranged off-axis, as illustrated in FIG. 1B. In FIGS. 1C and 1D, the hole is configured as a blind hole parallel to the extension direction of the probe shaft 134. The first optical sensor 110 can be configured to measure the measurement object 114 through a remaining material of the probe ball. In particular, a surface of the probe ball can be configured as reference surface 124 of the first optical sensor 110. In the exemplary embodiment shown in FIG. 1C, the blind hole is arranged axially with respect to an axis 140 through a midpoint of the ball. The blind hole can be filled with a liquid 142, for example an immersion medium, as shown in FIG. 1D. The liquid 142 can have a refractive index corresponding to a refractive index of the probe ball. An integration into the probe ball allows the first optical sensor 110 to be protected against mechanical collisions. Furthermore, at the same time as the detection of the fine shape by the first optical sensor 110, the second sensor 128 supplies at least one regulation signal required for the control and evaluation unit 126 of the coordinate measuring machine 111 for a positioning at the measurement object 114 in order to keep the first optical sensor 110 at the correct working distance.

FIG. 2 shows a schematic illustration of an exemplary embodiment in which the second sensor 128 includes at least one chromatic confocal sensor 144. The second sensor 128 can have at least one second illumination device (not illustrated here) configured to generate at least one second illumination light beam. The second illumination device can be configured identically to or differently from the first illumination device. The second illumination device can be integrated in the first illumination device. The second illumination device can be identical to the first illumination device. The second sensor 128 can have at least one second optical waveguide 146. The second optical waveguide 146 can include at least one monomode fiber and/or at least one multimode fiber. The second illumination device can be configured to couple the second illumination light beam into the second optical waveguide 146. The second sensor 128 can have at least one optical element 148 configured to focus the second illumination light beam depending on a wavelength of the second illumination light beam at different distances within the second measurement region with respect to the optical element 148. The first optical waveguide 120 and the second optical waveguide 146 can be arranged parallel to one another. By way of example, the first optical waveguide 120 and the second optical waveguide 146 can be arranged parallel and/or alongside one another. A fiber end of the first optical waveguide 120 can be arranged parallel to a fiber end of the second optical waveguide 146. The optical element 148 can be configured to focus the first illumination light beam at at least one focal point 150, wherein the focal point 150 is arranged within the second measurement region, that is to say with respect to the distance to the element 148, that is to say in particular with respect to the measurement direction. The first measurement region and the second measurement region can be laterally offset. The optical element 148 can be configured to focus the second illumination light beam at a focal point 152. The first optical sensor 110 can be integrated into the chromatic confocal sensor 144 in such a way that the fiber end of the first optical waveguide 120 is arranged parallel to the fiber end of the second optical waveguide 146 upstream of a sensor optical unit 154 and is likewise imaged onto the surface 112 of the measurement object 114 by the sensor optical unit 154. The coordinate measuring machine 111 and/or the probing element 100 can be configured to coordinate and/or to adapt a focal position of the first optical sensor 110 in relation to the working range of the chromatic confocal sensor 144, for example already during assembly of the machine, for example by axial displacement of the fiber ends relative to one another. Reference numeral 155 shows a settable or set distance between the fiber ends. The sensor optical unit 154 can have at least one beam splitter 156 configured to split the first illumination light beam into a measurement beam path and a reference beam path 158. The reference beam path 158 can have at least one further optical element 159, for example at least one lens and/or at least one lens system and/or at least one stop. The beam splitter 156 can be selectively coordinated with working wavelengths of the first optical sensor 110 and/or of the second sensor 128. By way of example, the beam splitter 156 can have a reflectivity of 50% for a working wavelength, for example 1.5 μm, of the first optical sensor 110 and have a transmission of approximately 100% for a working wavelength of the second sensor 128, for example a wavelength of from 400 nm up to 800 nm. The control and evaluation unit 126 can have at least one spectrometer 160, for example for evaluating the second sensor 128. The second sensor 128 can be configured to image a second light beam reflected from the measurement object 114 onto the second optical waveguide 146. The second optical waveguide 146 can be configured to guide the second reflected light beam to the spectrometer 160. The spectrometer 160 can be configured to evaluate the second reflected light beam with regard to wavelength and to generate the information about the coarse shape of the measurement object 114 and/or about the distance to the measurement object 114. The light of the first sensor 110 can be guided by the first optical waveguide to the evaluation unit 118. The evaluation unit 118 can either evaluate the phase difference of the superimposed reference and measurement beams or else, in the case of a chromatic confocal sensor, likewise be configured as a spectrometer and evaluate the wavelength of the light guided back.

Figure 3:
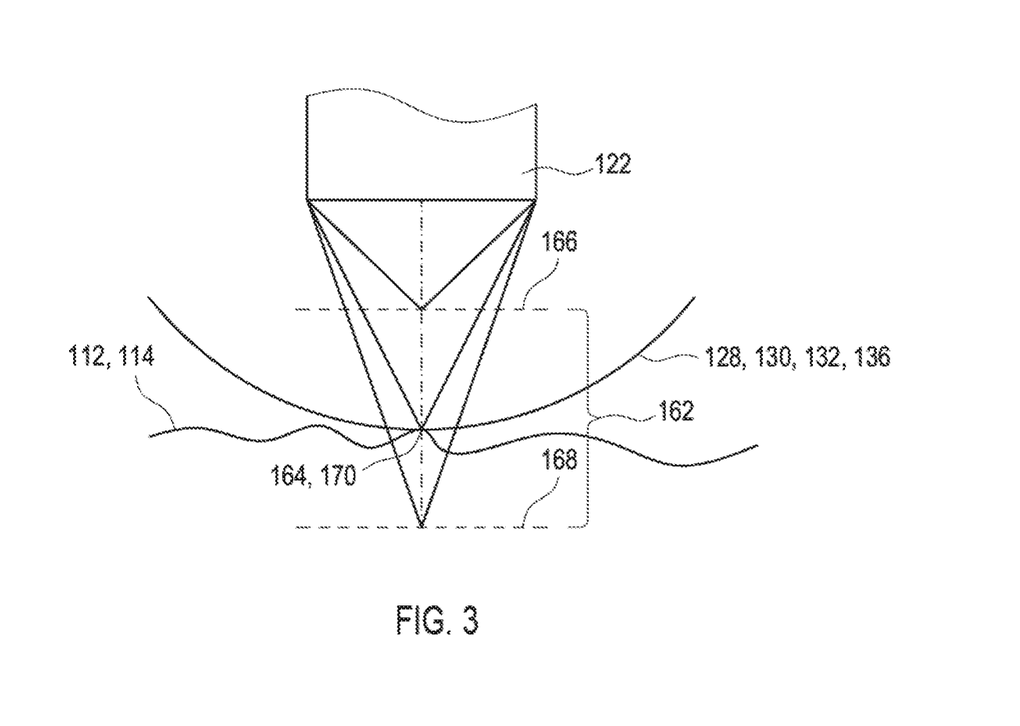
FIG. 3 shows a schematic illustration of a first measurement region.

The first optical sensor 110 has a first measurement region 162 and the second sensor 128 has a second measurement region 164. The first measurement region 162 can be delimited by a first measurement region beginning 166 and a first measurement region end 168. The first measurement region beginning 166 can be for example a first distance between the first optical sensor 110 and the surface 112 of the measurement object 114 starting from which the first optical sensor 110 begins to yield data within predefined and/or predeterminable measurement tolerances. The first measurement region beginning 166 can be for example a shortest possible distance between first optical sensor 110 and surface 112 of the measurement object 114 at which a measurement is possible within predefined and/or predeterminable measurement tolerances. The first measurement region end 168 can be a second distance between the first optical sensor 110 and the surface 112 of the measurement object 114, at which the first optical sensor 110 still yields data within predefined and/or predeterminable measurement tolerances, but with a further increase in the distance a measurement is no longer possible within predefined and/or predeterminable measurement tolerances. The second measurement region 164 can be punctiform. By way of example, in the case of a configuration of the second sensor 128 as a tactile sensor 130, the measurement region 164 can be a point of contact 170 between the tactile sensor 130 and the measurement object 114.

The first optical sensor 110 is at least partly integrated in the second sensor 128 in such a way that the first measurement region 162 and the second measurement region 164 at least partly overlap. By way of example, in the case of a configuration as a tactile sensor 130, the second measurement region 164 can be the point of contact 170 between the tactile sensor 130 and the measurement object 114. The point of contact 170 can lie in the first measurement region 162 of the first optical sensor 110.

FIG. 4 schematically shows one exemplary embodiment of the coordinate measuring machine 111 for measuring the at least one measurement object 114. The coordinate measuring machine 111 can be a gantry-type measuring machine or a bridge-type measuring machine. The coordinate measuring machine 111 can include a support 172, in particular a measurement table, on which the measurement object 114 can be arranged. The coordinate measuring machine 111 can include at least one gantry or bridge, identified here by reference sign 174, which has at least one first vertical column, at least one second vertical column and a cross beam connecting the first vertical column and the second vertical column. At least one vertical column selected from the first and second vertical columns can be mounted on a main body, for example the measurement table, in a manner movable in a horizontal direction by a guide. The horizontal direction can be a direction along a y-axis 176. The coordinate measuring machine 111 can have a coordinate system, for example a Cartesian coordinate system or a spherical coordinate system. Other coordinate systems are also conceivable. An origin or zero point of the coordinate system can be defined for example by a sensor of the coordinate measuring machine 111. By way of example, a guide can extend horizontally along the y-axis and be configured to move the gantry 174 and/or the at least one column of the gantry linearly, along the y-axis. An x-axis 178 can extend perpendicular to the y-axis 176, in a plane of the supporting surface of the main body. A z-axis 180 can extend perpendicular to the plane of the supporting surface, in a vertical direction. The vertical columns can extend along the z-axis. The cross beam can extend along the x-axis.

The coordinate measuring machine 111 can have at least one measuring slide which is mounted so as to be movable along the cross beam. In the measuring slide there can be mounted a sleeve which is movable in a vertical direction, for example along the z-axis 180. The sensor 110 can be arranged at a lower end, in particular an end facing in the direction of the supporting surface, of the sleeve.

It is understood that the foregoing description is that of the exemplary embodiments of the invention and that various changes and modifications may be made thereto without departing from the spirit and scope of the invention as defined in the appended claims.

LIST OF REFERENCE NUMERALS

100 Probing element
110 First optical sensor
111 Coordinate measuring machine
112 Surface
114 Measurement object
116 Sensor
118 Interferometer
120 First optical waveguide
122 Sensor head
124 Reference surface
126 Control and evaluation unit
128 Second sensor
130 Tactile sensor
132 Tactile probe element
134 Probe shaft
136 Probe head
138 Hole
140 Axis
142 Liquid
144 Chromatic confocal sensor
146 Second optical waveguide
148 Optical element
150 Focal point of the first optical sensor
152 Focal point of the second sensor
154 Sensor optical unit
155 Distance
156 Beam splitter
158 Reference beam path
159 Further optical element
160 Spectrometer
162 First measurement region
164 Second measurement region
166 First measurement region beginning
168 First measurement region end
170 Point of contact
172 Support
174 Gantry/bridge
176 y-axis
178 x-axis
180 z-axis

What is claimed is:

1. A probing element for measuring at least one measurement object, the probing element comprising:
   at least one first optical sensor configured to generate at least one first sensor signal depending on a fine shape of at least one surface of the at least one measurement object;
   at least one second sensor configured to generate at least one second sensor signal depending on at least one of a coarse shape of the at least one measurement object and a distance to the at least one measurement object,
   wherein the at least one first optical sensor has a first measurement region and the at least one second sensor has a second measurement region, and
   wherein the at least one first optical sensor is at least partly integrated in the at least one second sensor to permit the first measurement region and the second measurement region to at least partly overlap.

2. The probing element according to claim 1, wherein the at least one first optical sensor includes a sensor configured to carry out non-contact and interferometric measurements, and wherein the at least one first optical sensor includes at least one interferometer.

3. The probing element according to claim 2, wherein the at least one first optical sensor includes at least one first illumination device configured to generate at least one first illumination light beam, wherein the at least one first optical sensor includes at least one first optical waveguide, and wherein the at least one first illumination device is configured to couple a first illumination light beam into the at least one first optical waveguide.

4. The probing element according to claim 1, wherein the at least one first optical sensor includes at least one first illumination device configured to generate at least one first illumination light beam, wherein the at least one first optical sensor includes at least one first optical waveguide, and wherein the at least one first illumination device is configured to couple a first illumination light beam into the at least one first optical waveguide.

5. The probing element according to claim 4, wherein the at least one first optical sensor includes at least one sensor head, wherein the at least one first optical waveguide is configured to couple the at least one first illumination light beam into the at least one sensor head, and wherein the at least one sensor head is configured to illuminate the at least one measurement object and to detect a measurement light beam being at least one of a reflected light beam and a backscattered light beam from the at least one measurement object.

6. The probing element according to claim 5, wherein the at least one first optical sensor includes at least one reference surface configured to at least partly reflect the first illumination light beam, wherein the at least one sensor head is configured to detect a reference light beam reflected at the at least one reference surface and to couple the reference light beam into the at least one first optical waveguide, and wherein the at least one first optical sensor is configured to determine a phase difference between the measurement light beam and the reference light beam.

7. The probing element according to claim 4, wherein the at least one second sensor includes at least one chromatic confocal sensor, wherein the at least one second sensor includes at least one second illumination device configured to generate at least one second illumination light beam, wherein the at least one second sensor includes at least one second optical waveguide, wherein the at least one second illumination device is configured to couple the at least one second illumination light beam into the at least one second optical waveguide, wherein the at least one second sensor includes at least one optical element configured to focus the at least one second illumination light beam depending on a wavelength of the at least one second illumination light beam at different distances within the second measurement region with respect to the at least one optical element, wherein the at least one first optical waveguide and the at least one second optical waveguide are arranged parallel to one another, wherein a fiber end of the at least one first optical waveguide is arranged parallel to the fiber end of the at least one second optical waveguide, wherein the at least one optical element is configured to focus the first illumination light beam at at least one focal point, and wherein the at least one focal point is arranged within the second measurement region.

8. The probing element according to claim 1, wherein the at least one second sensor includes at least one tactile sensor having at least one tactile probe element, wherein the at least one tactile probe element has a sensor surface, wherein the at least one tactile probe element is configured to probe the at least one measurement object tactilely at at least one probing point.

9. The probing element according to claim 8, wherein the at least one first optical sensor is at least partly integrated in the at least one tactile probe element, wherein the at least one tactile probe element includes at least one probe shaft and a probe head, wherein the probe head includes at least one probe ball, and wherein at least one first optical waveguide is at least partly arranged in the at least one probe shaft and at least one sensor head is at least partly arranged in the at least one probe ball.

10. The probing element according to claim 9, wherein the at least one probe ball has at least one hole selected from the group consisting of: at least one first through hole parallel to an extension direction of the at least one probe shaft, at least one second through hole perpendicular to the extension direction of the at least one probe shaft, at least one first blind hole parallel to the extension direction of the at least one probe shaft, and at least one second blind hole perpendicular to the extension direction of the at least one probe shaft.

11. The probing element according to claim 10, wherein the at least one hole is a blind hole, wherein the blind hole is filled with a liquid, and wherein the liquid has a refractive index corresponding to the refractive index of the at least one probe ball.

12. The probing element according to claim 1, wherein the at least one second sensor includes at least one spectrometer.

13. A coordinate measuring machine for measuring at least one measurement object, the coordinate measuring machine having at least one probing element, the at least one probing element comprising:
at least one first optical sensor configured to generate at least one first sensor signal depending on a fine shape of at least one surface of the at least one measurement object;
at least one second sensor configured to generate at least one second sensor signal depending on at least one of a coarse shape of the at least one measurement object and a distance to the at least one measurement object;
at least one control and evaluation unit configured to control the at least one first optical sensor and the at least one second sensor and to generate at least one first item of information about the fine shape of the at least one surface of the at least one measurement object from at least one first optical sensor signal and to generate at least one second item of information about at least one of the coarse shape of the at least one measurement object and the distance to the at least one measurement object from a second sensor signal,
wherein the at least one first optical sensor has a first measurement region and the at least one second sensor has a second measurement region, and wherein the at least one first optical sensor is at least partly integrated in the at least one second sensor to permit the first measurement region and the second measurement region to at least partly overlap.

14. The coordinate measuring machine according to claim 13, wherein the coordinate measuring machine is configured to simultaneously detect at least one item of information about at least one of the fine shape of the at least one surface of the at least one measurement object, the at least one of the coarse shape of the at least one measurement object, and the distance to the at least one measurement object.

15. A method for measuring the at least one measurement object by the coordinate measuring machine according to claim 13, the method comprising:
generating the at least one first optical sensor signal depending on the fine shape of the at least one surface of the at least one measurement object by the at least one first optical sensor;
generating at least one second sensor signal depending on the at least one of the coarse shape of the at least one measurement object and the distance to the at least one measurement object by the at least one second sensor, wherein the at least one first optical sensor has the first measurement region and the at least one second sensor has the second measurement region, wherein the at least one first optical sensor is at least partly integrated in the at least one second sensor to permit the first measurement region and the second measurement region to at least partly overlap;
generating at least one item of information about the fine shape of at least one surface of the at least one measurement object from the at least one first optical sensor signal and at least one item of information about the at least one of the coarse shape of the at least one measurement object and the distance to the at least one measurement object from the second sensor signal by the at least one control and evaluation unit.

16. A method for regulating a movement of the coordinate measuring machine according to claim 13, the method comprising:
generating the at least one first optical sensor signal depending on the fine shape of at least one surface of at least one measurement object by the at least one first optical sensor;
generating at least one second sensor signal depending on the at least one of the coarse shape of the at least one measurement object and the distance to the at least one measurement object by the at least one second sensor, wherein the at least one first optical sensor has the first measurement region and the at least one second sensor has the second measurement region, wherein the at least one first optical sensor is at least partly integrated in the at least one second sensor to permit the first measurement region and the second measurement region to at least partly overlap; and
regulating the movement of at least one of the coordinate measuring machine and the at least one probing element of the coordinate measuring machine along a surface of the at least one measurement object based on the second sensor signal.

* * * * *